July 31, 1962 F. V. KOLDA ET AL 3,046,634
LAMP BRIDGE MAKING MACHINE
Filed May 4, 1959 4 Sheets-Sheet 2
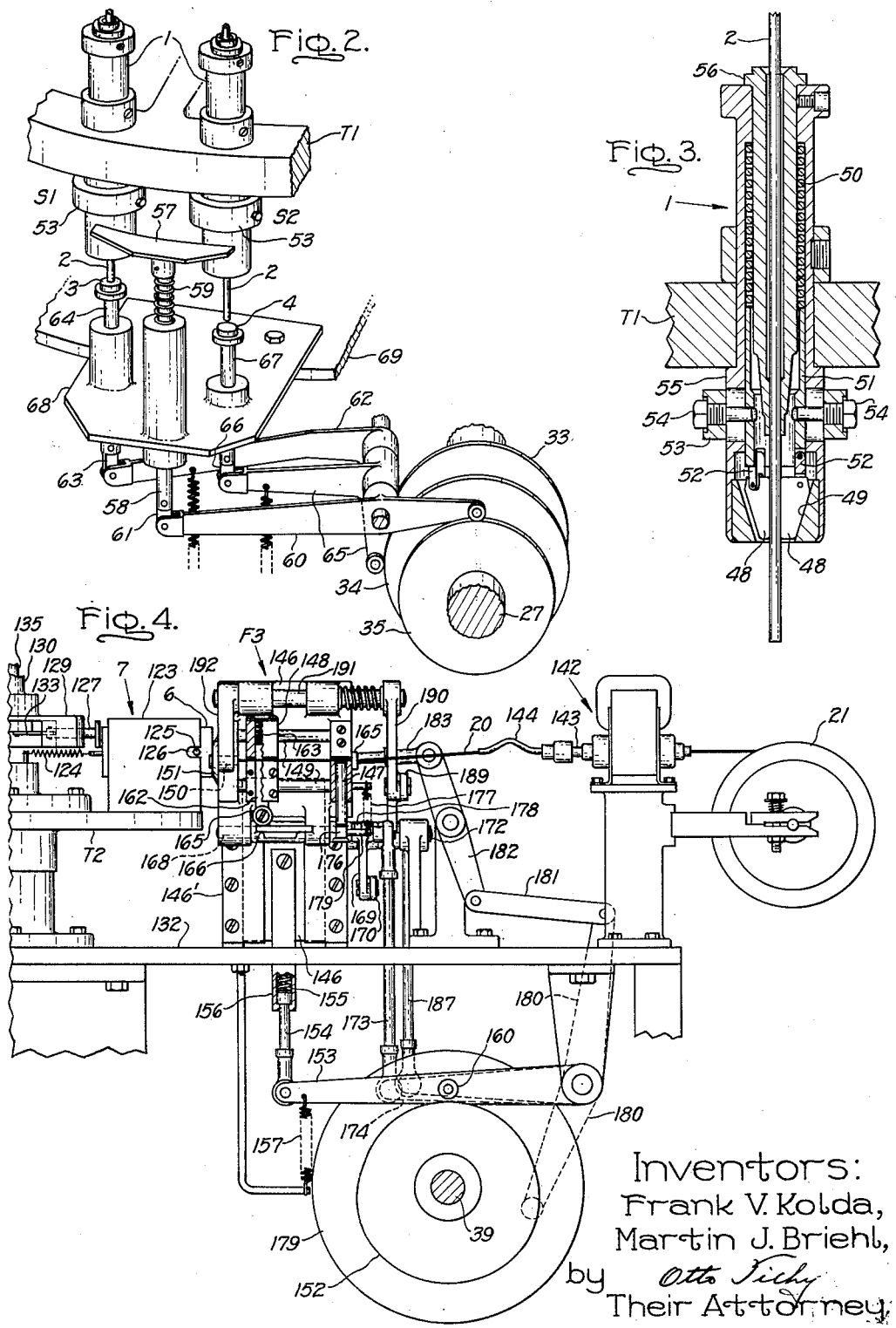
Inventors:
Frank V. Kolda,
Martin J. Briehl,
by Otto Tichy
Their Attorney.

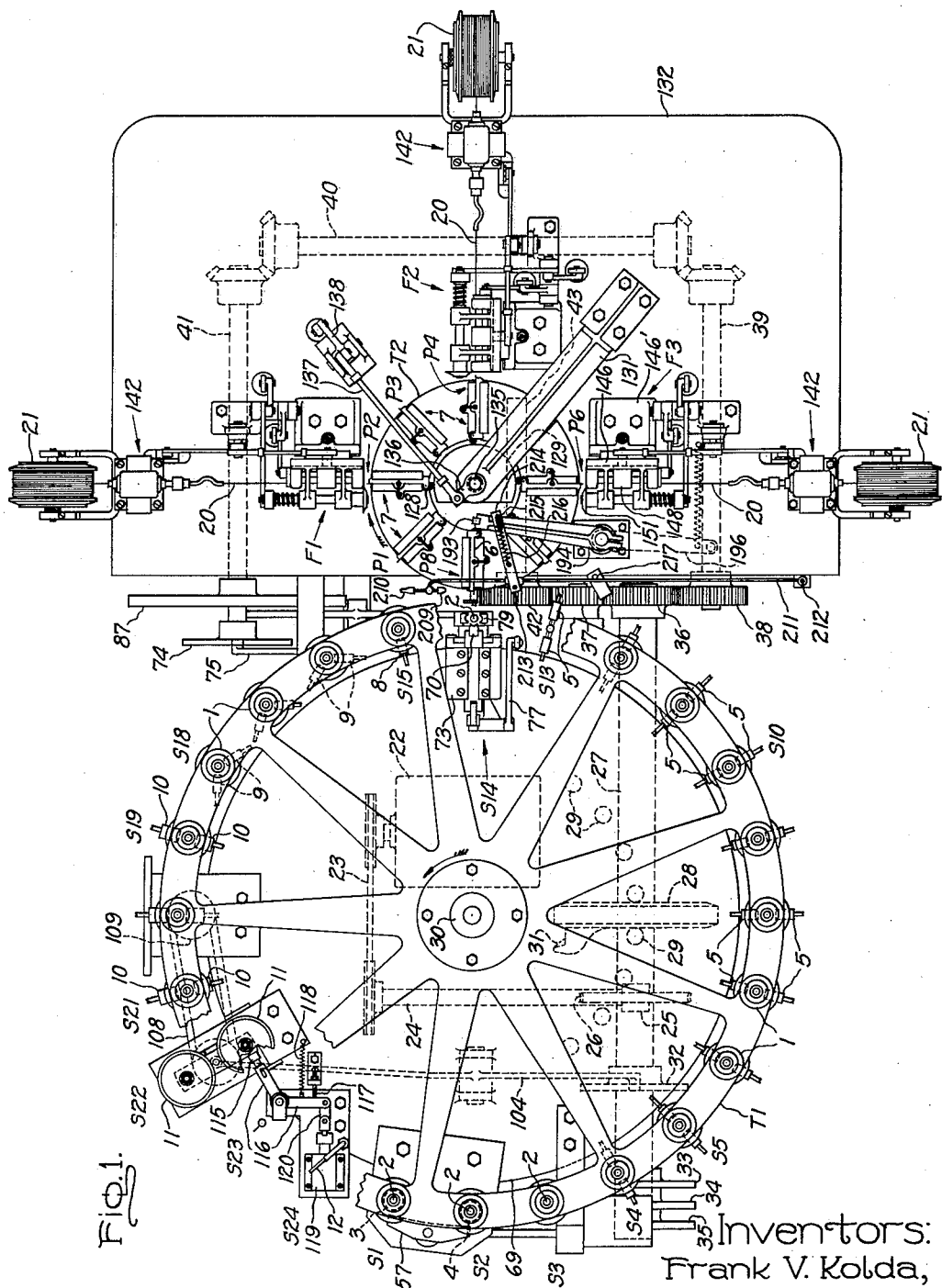

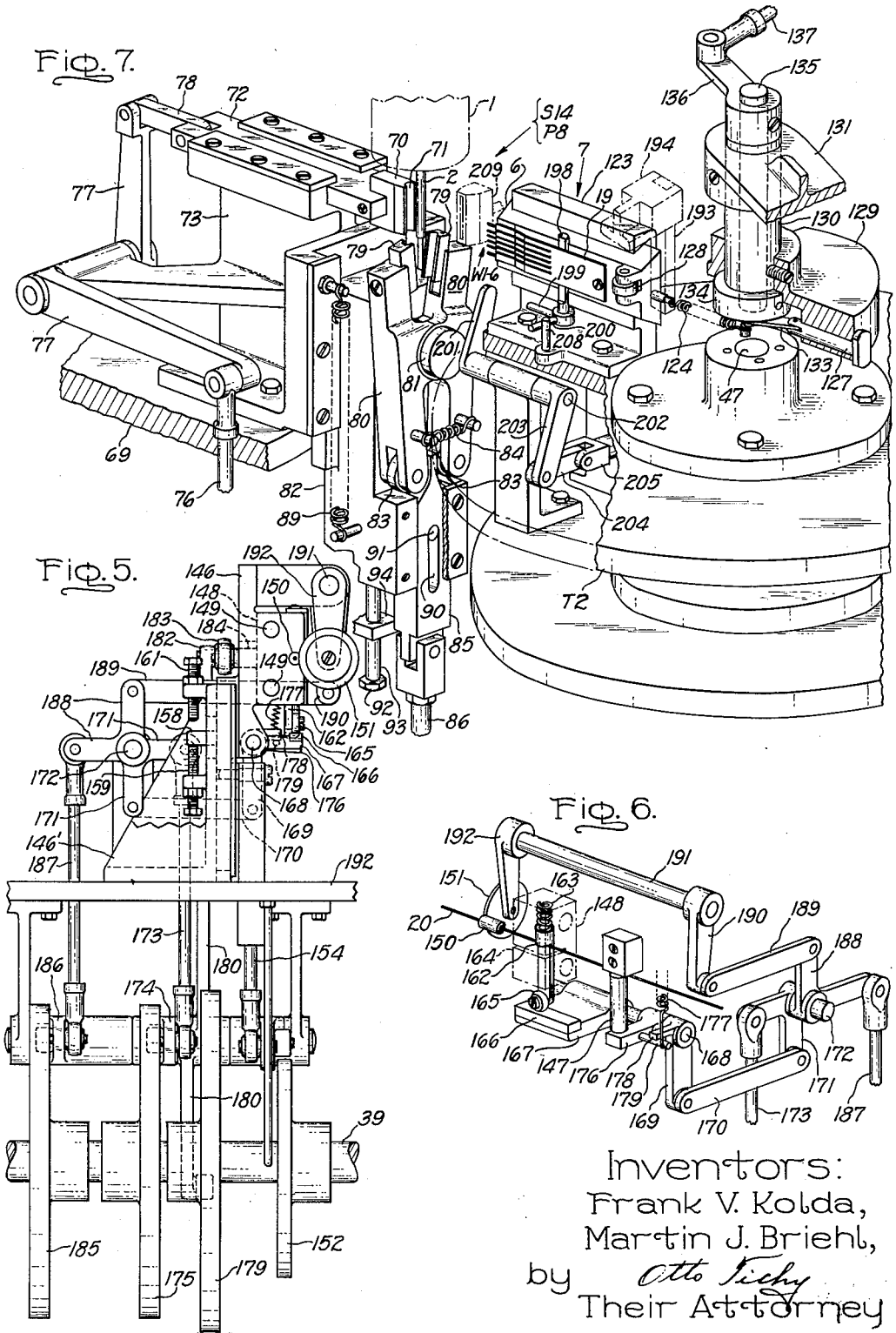

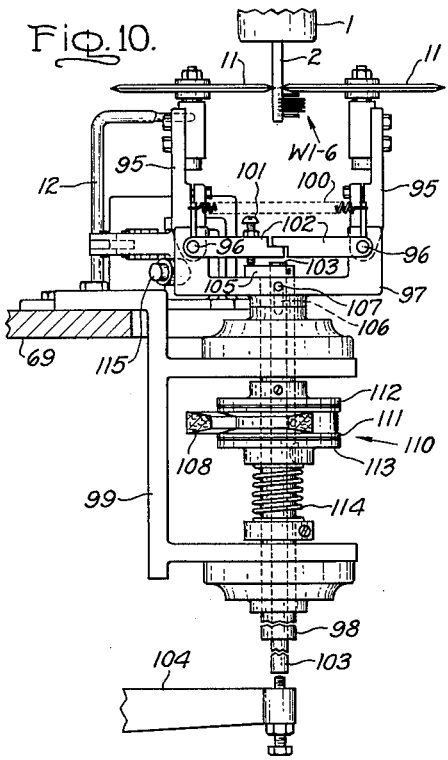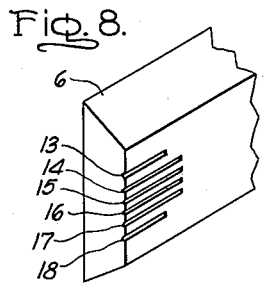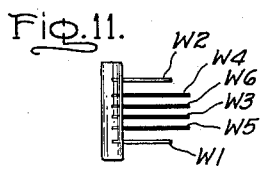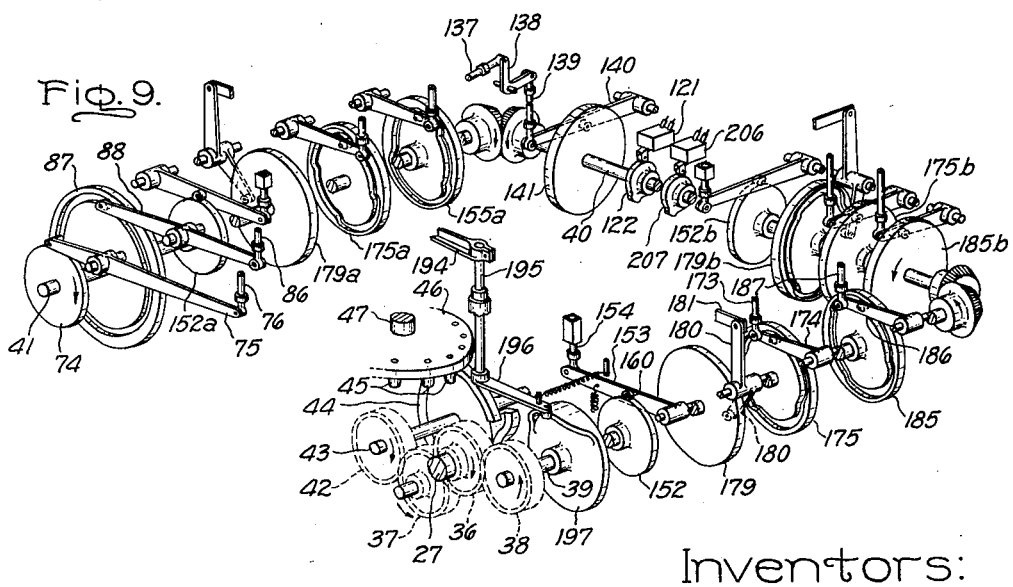

United States Patent Office 3,046,634
Patented July 31, 1962

3,046,634
LAMP BRIDGE MAKING MACHINE
Frank V. Kolda, Independence, and Martin J. Briehl, Cleveland Heights, Ohio, assignors to General Electric Company, a corporation of New York
Filed May 4, 1959, Ser. No. 810,957
7 Claims. (Cl. 29—25.2)

Our invention relates to the manufacture of so-called "bridges" employed in electric lamps, electronic tubes and similar devices, for supporting internal elements such as filaments, and which comprise a length of glass rod or cane having a plurality of wires with one end embedded in the rod and laterally extending therefrom generally in a single plane including the axis of the rod. It is an object of our invention to provide automatic equipment for the manufacture of such bridges at a rapid rate and in an economical manner.

In accordance with one feature of our invention, the bridges are made continuously from long lengths of glass rod stock by heating an end portion of the rod to a plastic condition, inserting the wires therein and severing the said end portion. In accordance with another feature, individual wire lengths are collected in a common holder from several sources of supply and then simultaneously inserted into the glass rod. In a preferred arrangement, the glass rod stock is carried along a path of movement during which an end portion thereof is heated to a plastic condition; at the same time, a wire inserting device travels along another path in the course of which individual wire lengths are supplied to the inserting device from long lengths of wire stock and arranged in the inserting device in a row in parallel relationship, after which the device arrives at a point adjacent to the path of the glass rod and thrusts the ends of the array of wires into the heated end portion of the glass rod; in the course of further travel of the rod stock, the said end portion, with the ends of the wires embedded therein, is severed from the remainder of the stock, and the operations are repeated to form successive bridges from the same length of glass stock.

Further features and advantages of our invention will appear from the following detailed description of a species thereof and from the drawings wherein:

FIG. 1 is a plan view of an automatic bridge making machine comprising our invention, and including a glass rod stock carrying turret at the left of the view and an associated wire feeding and inserting turret at the right of the view;

FIG. 2 is a fragmentary perspective view of mechanism for positioning the glass rods in their holders or chucks;

FIG. 3 is an elevation, in section, of one of the rod holding chucks;

FIG. 4 is a fragmentary side elevation of the wire inserting turret showing a wire inserting head and one of several feeding mechanisms adjacent said turret for supplying wires to said head;

FIG. 5 is a front elevation of the wire feeding mechanism shown in FIG. 4;

FIG. 6 is a perspective view showing diagrammatically the essential operating elements of the wire feeding mechanism;

FIG. 7 is a perspective view showing a wire inserting head and actuating means therefor, with the head located at an inserting station of the glass rod carrying turret;

FIG. 8 is a fragmentary perspective view of a wire-holding slide member constituting part of one of the wire inserting heads;

FIG. 9 is a perspective view of the various actuating cams;

FIG. 10 is an elevation of a cutting disc mechanism for severing the lower end portion of the glass rod stock subsequent to insertion of the wires therein; and FIG. 11 is an elevation of a completed bridge as made by the machine illustrated in the drawing.

In the embodiment of the invention illustrated herein, and speaking generally, the machine comprises a horizontal turret or spider T1 (FIG. 1) carrying a plurality (24) of chucks 1 (FIGS. 1 and 3) each adapted to hold a long length (40 inches for example) of glass rod stock 2 and carry it to work stations or positions S1 to S24. At station S1 the chuck 1 is opened to release the rod 2 onto a gauging button 3 (FIG. 2) which is then lowered to permit the rod 2 to drop down a predetermined distance after which the chuck is again closed. At station S2, the chuck 1 is preferably again opened to release a rod 2 to a second gauging button 4 which is lowered a predetermined amount and then again raised, whereby any length of rod 2 which is too short to be properly held in correct alignment in the chuck 1 is permitted to drop out during the lowering step. At stations S4 to S13, the lower end of the rod 2 is progressively heated to a plastic condition by flames from opposed pairs of burners 5 having vertically elongated faces. At station S14, a vertical row of horizontally disposed wires W1 to W6 (FIGS. 7 and 11) is projected end foremost into the plastic end portion of the rod 2 by a horizontally reciprocable wire holder 6 constituting part of eight similar heads 7 on a second smaller turret T2 which is arranged to be indexed in synchronism with the larger turret T1. At stations S15 to S18 of turret T1, the end of rod 2 is annealed by a single burner 8 at station S15 and pairs of burners 9 at stations S16 to S18, the said burners having vertically elongated orifices. At stations S19 to S21, opposed burners 10 with horizontally elongated orifices heat and soften a localized area or zone of the glass rod 2 above the wires W1 to W6 where it is to be severed. At station S22, the rod 2 is scored or grooved circumferentially by a pair of relatively large cutting discs 11 (FIGS. 1 and 10) at opposite sides of the rod 2 and which are rotated bodily around the rod to cut the groove therein. No operations are performed at stations S23 and S24, but during indexing of the chuck 1 and rod 2 between stations S23 and S24 the end of the rod 2 strikes a stationary pin or post 12 to break it off at the groove formed by the disc 11 and thereby form the completed bridge (FIG. 11) which drops down a suitable chute and into a hopper (not shown).

Now referring generally to the wire inserting mechanism shown at the right in FIG. 1, the heads 7 on turret T2 are carried to eight stations or positions P1 to P8. At each of stations P2, P4 and P6 there is located a wire feeding mechanism indicated by the respective numerals F1, F2 and F3. In the illustrated embodiment, each of the wire feeding mechanisms feeds a pair of the wires W1 to W6 into a given pair of parallel, horizontal, V-shaped grooves or slots 13 to 18 (FIG. 8) in the wire holder 6 of each head 7, the wires being retained in said slots by the finger portions of a leaf spring 19 (FIG. 7). The wires W1 to W6 are formed from continuous lengths of wire stock 20 drawn from spools 21 associated with each feeding mechanism which goes through two feeding cycles during the dwell of the head 7 at the station occupied thereby so as to twice advance an end of the wire 20 into the holder 6 at different elevations and sever it to form a pair of the wires W1 to W6. When the head 7 is indexed into position P8, which is coincident with station S14 of turret T1, the holder 6 is moved radially forward to thrust the ends of the wires W1 to W6 into the plastic end of the glass rod 2.

Referring now to the driving arrangement for the turrets and various working mechanisms, there is a main drive motor 22 (FIG. 1) located under the larger turret T1 and connected by a belt 23 to a shaft 24 having thereon a worm gear 25 meshing with a worm wheel 26 on a drive shaft 27 which turns one revolution for each index of turret T1. For indexing the turret T1 (counterclockwise in FIG. 1) there is a conventional indexing mechanism comprising a sine type cam 28 fixed on shaft 27 and in cooperative engagement with rollers 29 having vertical axes and carried at the underside and adjacent the periphery of a wheel or spider (not shown) which is fixed to the vertical column or shaft 30 to which the turret T1 is fixed. The continuously rotating disc cam 28 has a segment 31, preferably of 90° arcuate extent, spirally grooved to successively engage with the rollers 29 which correspond in number to the heads or chucks 1. The actual indexing is effected by the segment 31 and the turret is maintained stationary during its dwell period by the presence of the disc 28 between a pair of the rollers 29.

The left end of the drive shaft 27 carries a cam 32 for controlling the opening and closing of the cutting wheels or discs 11, cams 33 and 34 for controlling the height of the gauging buttons 3 and 4, respectively (FIG. 2), and a cam 35 for opening and closing the chucks 1.

At its right end, the drive shaft 27 carries a gear 36 (FIGS. 1 and 9) which meshes with gears 37 and 38. Gear 38 drives a cam shaft 39 which is geared to a second cam shaft 40 which, in turn, is geared to a third cam shaft 41. Gear 37 meshes with a gear 42 on shaft 43 which carries an indexing cam 44 for indexing the smaller turret T2 clockwise in FIG. 1. The indexing cam 44 cooperates with rollers 45 on a wheel or spider 46 which is fixed to a vertical column 47 to which the turret T2 is fixed; these indexing elements correspond to the indexing cam 28, rollers 29, etc., associated with the large turret T1.

The shafts 39, 40 and 41 carry cams for actuating the respective wire feed mechanisms F3, F2 and F1, respectively, as well as certain additional cams, all of which will be referred to hereinafter.

Now referring in detail to the construction and operation of the work assembly or mechanism associated with the larger turret T1, the chucks 1 are of conventional construction and, as illustrated in FIG. 3, the glass rod 2 is gripped therein by wedge members 48 which are biased downward against an inclined surface 49 by a spring 50 acting through an inner sleeve 41 which is connected by links 52 to the wedges 48. To release the rod 2, the wedges 48 are opened or retracted by application of pressure upward against a ring or collar 53 which is connected to sleeve 51 by pins 54 extending through slots in the wall of the chuck body 55, the rod 2 being maintained in proper vertical alignment by a fixed inner sleeve 56.

At station S1 to turret T1, the chuck 1 is opened to lower the glass rod 2 during the dwell period of the turret when the collar 53 is engaged by a pusher plate member 57 (FIG. 2) at the upper end of a rod 58 which is biased upwardly by a spring 59 under the control of the cam 35 to which the rod 58 is connected by a lever 60 and link 61. At the beginning of the dwell period, the gauging button 3 is at an elevation such that it is a short distance (about one-sixteenth inch for instance) below the end of the rod 2, so that the rod falls freely onto the button. The button 3 is then lowered a predetermined distance (say about one inch) to expose a desired length of the rod; the chuck 1 is closed by lowering of the pusher member 57 and the button is then lowered an additional small distance to clear the rod 2. The movements of the button 3 are controlled by the cam 33 through a lever 62, link 63 and rod 64 which carries the button.

The chuck 1 is then indexed to station S2 where the rod 2 is lowered still further and then again raised to the desired elevation by button 4 under the control of cam 34 acting through lever 65, link 66 and rod 67 which carries button 4. At the beginning of the dwell period, the button 4 is at an elevation such that it is a short distance under the end of rod 2, the chuck 1 is opened by engagement of pusher member 57 with collar 53 to permit the rod to fall freely onto the button 4. Then the button 4 is momentarily lowered by cam 34 after which it is again raised to original elevation, the chuck is closed by lowering of the pusher member 57, and the button 4 is again lowered a short distance to its original elevation. The reason for lowering the rod 2 at this station is that if it is below a certain minimum length it will fall out of the chuck, the minimum length being that which leaves a sufficient length of the rod within the chuck to hold it in proper vertical alignment.

The several supporting rods 58, 64 and 67 for the pusher member 57 and buttons 3 and 4 are supported for reciprocation from a plate 68 attached to a stationary table 69 under the turret T1.

At stations S4 to S13 (FIG. 1) the lower end of the rod 2 is heated progressively to a plastic condition by the pairs of opposed burners 5.

At station S14, the group of wires W1 to W6 is inserted end foremost into the plastic lower end of the rod 2 by the wire holder 6 (FIG. 7). Since the rod is plastic at this time, it is desirable that provision be made for backing it up in order that pressure from the insertion of the wires will not cause it to be bent to a useless shape. For this purpose there is provided a die member 70 having a vertically elongated concave face 71 shaped to fit the rod 2. At the time the chuck 1 is indexed into station S14, the backing die 70 is withdrawn or retracted and, during the dwell of the turret, the die is moved forward to support the rod 2 at the time the wires are inserted therein, and is again retracted.

The backing die 70 is carried at the end of a horizontal slide 72 which is mounted for reciprocation in ways in a bracket 73 supported on table 69 and which is actuated by a cam 74 (FIGS. 1 and 9) on shaft 41, through a lever 75, connecting rod 76, bell crank 77 (FIG. 7) and link 78 which is coupled to the slide 72.

Under certain circumstances the glass rod 2 may be deformed in cross section at the time the wires W1 to W6 are pushed into it; it may, for example, assume a somewhat elliptical shape in cross section. In that event, it may be desirable to reshape the rod. To that end, we have illustrated herein a mechanism whereby, as soon as the wires have been inserted into the rod 2 and the backing die 70 has been retracted, a pair of forming dies 79 (FIG. 7) having opposed concave faces rise from below and squeeze the rod 2 from the side to reshape it to a substantially circular cross section.

The forming dies 79 are carried by the upper end of a pair of jaws or arms 80 which are pivotally mounted on a pin 81 mounted on a slide 82 which is mounted for vertical reciprocation in ways in the bracket 73. The lower ends of jaws 80 carry rollers 83 and are normally biased to a closed position by a spring 84 which holds the rollers against the sides of a plate cam 85 which is slidably mounted in ways in the slide 82. The cam 85 is connected to a connecting rod 86 which is controlled by a cam 87 (FIGS. 1 and 9) on shaft 41, through a lever 88. The slide 82 is biased upwardly by a spring 89 which is connected between posts on the slide and on the bracket 73; however, the upward movement of said slide 82 is controlled by the plate cam 85 which has thereon a slot 90 the upper end of which is engaged by a pin 91 mounted on the slide 82.

During the index period of turret T1, the assembly of the forming die 79 is in the lowered position shown in FIG. 7 to avoid interference with the rod 2. At the beginning of the dwell period, the action of inserting the wires W1 to W6 takes place, immediately after which the wire holder 6 and the backing die are quickly moved away. When the movement of these two members is sufficient to avoid interference, the forming die assembly is raised by upward motion of the connecting rod 86. For about the first half of the stroke, the dies 79 remain open; when they have been raised to an elevation opposite the glass rod 2, further upward motion thereof is prevented when a nut 92 on a stud 93 carried by the slide 82 engages a stop 94 extending from the table 69. However, the rod 86 continues to move upward to carry the plate cam 85 upwardly whereby the rollers 83 are forced apart to cause the forming dies 79 to close upon the glass rod 2 and reshape it. The dies 79 are immediately reopened by lowering of the connecting rod 86, and further downward movement of rod 86 lowers the forming die assembly.

As the rod 2, with the wires W1 to W6 attached thereto, is indexed through stations S15 to S18, it is heated by annealing fires from a single burner 8 at station S15 and pairs of burners 9 at stations S16 to S18 to relieve the strain in the glass rod. At stations S19 to S21 a narrow zone of the rod 2 just above the uppermost of the wires is heated by burner 10 to soften it for severance.

At station S22 the rod 2 is circumferentially grooved in the zone heated at stations S19 to S21 by a known arrangement of the cutting wheels or discs 11 which have sharp edges and which are rotated around the rod 2. The discs 11 are mounted on opposite sides of the path of travel of the rod 2 and at the upper ends of the vertical arms of bell cranks 95 (FIG. 10) which are pivotally mounted on pins 96 in a bracket 97 carried by the upper end of a hollow shaft 98 which is mounted for rotation in a bracket 99 mounted on the table 69. The discs 11 are biased toward each other by a spring 100 extending between the vertical arms of bell crank 95, and they approach each other to a predetermined spacing which is controlled by a stop screw 101 which is mounted in one of the lateral arm portions 102 of the bell cranks 95, which arm portions have overlapping ends.

At the time a rod 2 is being indexed to station S22, the discs 11 are held apart a sufficient distance to permit the rod to pass therebetween. The open position of the discs is maintained by a rod 103 which is at that time held in a raised position by a lever 104 under the control of the cam 32 (FIG. 1); the engagement of an arm 105 on rod 103 (FIG. 10) with the end of the stop screw 101 in one of the arms 102 causes the bell crank to be pivoted to the open position. The rod 103 is slotted at 106 to receive a pin 107 by which bracket 97 is secured to hollow shaft 98.

The discs 11 tend to rotate about the rod 2 under the influence of a belt 108 which is driven by a pulley 109 (FIG. 1) on a continuously operating electric motor (not shown) and which engages a slip clutch arrangement 110 (FIG. 10) on the shaft 98. The slip clutch arrangement 110 includes a pulley 111 which runs freely on shaft 98 and is gripped between a friction pad on a collar 112 attached to shaft 98, and another friction pad on a collar 113 which is keyed to shaft 98 for movement therealong and is biased upwardly against pulley 111 by a spring 114. However, rotation of the discs 11 is prevented, during the indexing period, by a spring-loaded latch or plunger 115 which engages the bracket 97 and is carried by a bell crank 116 (FIG. 1) which is held in blocking position against a stop screw 117 by a spring 118 and is under the control of a solenoid 119 which is connected by a link 120 to crank 116. During the dwell period of the turret T1, the latch 115 is swung clockwise in FIG. 1 out of engagement with bracket 97 when the solenoid 119 is energized by closing of a switch 121 (FIG. 9) under the influence of a cam 122 on shaft 40. This allows the discs 11 to be revolved and they are then permitted to move toward each other by lowering of push rod 103 under the influence of cam 32 whereby to cut a groove in the rod 1.

The rod 2 is then broken off at the groove formed by discs 11 as it is indexing between stations S23 and S24 when it strikes the stationary post or finger 12 projecting across the path of movement of the lower end of the rod.

Referring now more specifically to the wire feeding and inserting mechanisms associated with the smaller turret T2, each of the heads 7 thereon comprises a bracket 123 (FIG. 7) having horizontal ways for reciprocation therein of the wire holding slide 6 which is normally held in a retracted position radially inward of the turret by a spring 124 whereby a pin 125 (FIG. 4) on said slide is held against the end of a slot 126 in the bracket 123. As the heads 7 are indexed by the turret T2, they are supplied (in the illustrated embodiment of the invention) with a pair of the support wires W1 to W6 at each of stations P2, P4 and P6. At station P2, the feeding mechanism F1 feeds the shorter outermost wires W1 and W2 (FIG. 11) into the full length of the slots or grooves 18 and 13 respectively (FIG. 8) of the wire holder 6; at station P4, the feeding mechanism F2 feeds the longer wires W3 and W4 into the slots 16 and 14; and at station P6, the feeding mechanism F3 feeds the last pair of longer wires W5 and W6 into the slots 17 and 15, respectively.

At the time the wires are fed into the holders 6 at stations P2, P4 and P6, the said holders are held outward a short distance from their retracted position by plungers 127 (FIGS. 4 and 7) which engage respective rollers 128 on the slides 6. The said plungers 127 are radially mounted in a stationary hub member 129 which is mounted on a hollow vertical column 130 which is supported by an overhead bracket 131 mounted on a stationary table 132. The plungers 127 are coupled by links 133 to a collar 134 which is rotated to move the plungers in or out. The collar 134 is attached to a shaft 135 which extends through the post 130 and which is rotated by a crank arm 136 through a connecting rod 137 (FIG. 1), bell crank 138, connecting rod 139 (FIG. 9) and lever 140 which derives its motion from a cam 141 on the shaft 40.

The wire feed assembly F3 is further illustrated in FIGS. 4 and 5 and is generally similar to but like a mirror image of assemblies F1 and F2. The support wires W5 and W6 fed by assembly F3 are formed from a continuous length of wire stock 20 which is supplied from a spool 21 and passes through a known type of wire straightener 142 which comprises an electric motor having a hollow shaft 143 to which is attached a curved tube 144 through which the wire passes. After the wire leaves the straightener, it passes through a funnel-shaped die 145 on a vertically reciprocable slide 146 in a bracket 146' mounted on the table 132. The die 145 guides the wire to a stationary clamping mechanism comprising a pin 147 which is slidable in a cylindrical well in slide 146 and which is lowered to allow the wire to be moved forward but is raised to clamp the wire during the time there is no movement. The wire next goes to a movable clamping device 148 comprising a block or body portion which is slidably mounted on a pair of horizontal pins or shafts 149 supported by the slide 146. The clamping device 148 is closed during its motion from right to left in FIG. 4 to feed the wire, and is opened during the reverse stroke. The wire then passes through another die at 150 where, after having been advanced into the slot 17 in wire holder 6 (FIG. 8), it is cut off by a disc knife 151 which is also carried on the slide 146. Then, still during the same dwell period, the slide 146 is raised a predetermined amount and the feeding and severing operations are repeated to feed a second length of wire W6 into the slot 15 in wire holder slide 6.

The slide 146, with its assembly for clamping, advancing and cutting the wire 20, is shifted from its lower to its upper position, and back down, by a cam 152 on shaft 39, through a follower lever 153 and connecting rod 154 which is coupled through a spring 155 to a hollow rod 156 secured to the slide 146. Lever 153 is also biased toward the cam 152 by a spring 157. As shown in FIGS. 3 and 4, the slide 146 is in its lower position with a lug 158 thereon (FIG. 5) engaging a lower stop screw 159 on the bracket 146' and with the cam 152 out of engagement with the roller 160 on lever 153. The upper elevation of the slide 146 is determined by engagement of the lug 158 with an upper stop screw 161 on the bracket 146'; excess motion of the lever 153 and connecting rod 154 provided by the cam 152 is taken up by the spring 155.

Referring more particularly to the movable wire clamping device 148, it contains an inverted L-shaped clamping pin 162 (FIG. 6) which is vertically slidable in ways in the body portion of the device and which is normally biased downwardly by a spring 163 to clamp the wire 20 between the head portion of the pin 162 and a shoulder portion 164, the wire extending through a lateral passage in said body portion and across said shoulder 164. To release the pin 162 from clamping engagement with the wire 20 during retraction of the clamp 148 from left to right in FIG. 4, the said pin is raised by engagement of a roller 165 on the lower end thereof with a movable bar cam 166 which at that time is in a raised position. The said bar cam 166 is carried by the end of a lever 167 which is fastened to a shaft 168 which is journalled in slide 146 and to which is fastened an arm 169 which is connected to a link 170 which is connected to a bell crank 171 which pivots on a pin 172 supported from a part of bracket 146' and is connected to a connecting rod 173 which is connected to a follower lever 174 which derives its motion from a cam 175 on shaft 39.

The stationary wire clamping pin 147 is normally biased upward to clamping position by an arm 176 which engages the pin and which pivotally floats on shaft 168 and is biased upward by a spring 177. To release the pin 147 from clamping engagement with the wire 20 during the advancing movement of clamp 148 from right to left in FIG. 4, the arm 176 is pushed down by an arm 178 which engages a pin 179 on arm 176 and which is fastened to shaft 168 and is therefore actuated in synchronism with the actuation of cam bar 166 so that one of the clamps 147 and 148 is open when the other is closed.

The horizontal reciprocation of the clamping device 148 along rods 149 is controlled by a cam 179 on shaft 39 through a follower crank 180, link 181, lever 182, and connecting rod 183 which is connected to a stud 184 which is fastened to the body of the clamping device 148 and extends through an opening in the wall of the bracket 146'.

The wire cutting disc 151 is actuated by a cam 185 (FIGS. 5 and 9) on shaft 39 through a follower lever 186, connecting rod 187, bell crank 188 which pivots on pin 172, link 189 and arm 190 (FIG. 4) which is attached to shaft 191 journalled in slide 146 and to which is attached an arm 192 carrying the cutter disc 151.

To recapitulate the operation of the wire feeding mechanism F3, at the time a head 7 indexes into station P6, the slide 146 is in its lower position (as shown in FIGS. 4 and 5), the movable clamp 148 is to the right in FIG. 4, the bar cam 166 is depressed out of engagement with roller 165 so that clamping pin 162 grips the wire 20 whereas stationary clamping pin 147 is down and out of clamping engagement with the wire. During the dwell of the turret T2, clamp 148 moves from right to left in FIG. 4 to insert the end of wire 20 into the slot 17 (FIG. 8) in wire holder 6 and the cutter disc 151 is actuated to sever the wire 20 at the die 150; after the cutter disc 151 has been retracted, the slide 146 is then raised to its upper position, the cam bar 166 is moved up to release the clamping pin 162 from the wire 20, the clamping pin 147 is moved up to grip the wire 20, the movable clamp 148 is retracted to the right in FIG. 4, and bar cam 166 and arm 176 are then depressed so that the clamp 148 again grips the wire 20 while the clamping pin 147 releases the wire; then the feeding cycle is again repeated to cause the clamp 147 to carry the end of the wire 20 into the slot 15 in wire holder 6 and to sever the wire, after which the retracting portion of the cycle is repeated and the slide 146 is lowered to its initial position.

The wire feeding mechanisms F1 and F2 are similarly operated. The slide reciprocating cam 152, the wire feeding cam 179, the clamp actuating cam 175 and the wire cutter actuating cam 185 have their counterparts in respective cams 152a, 179a, 175a and 185a on shaft 41 for actuating the feeding mechanism F1, and in respective cams 152b, 179b, 175b and 185b for actuating the feeding mechanism F2. It will be understood that the feeding mechanism F1 feeds the outermost shorter pair of wires W1 and W2 to the holder slide 6, and mechanism F2 feeds the longer intermediate wires W3 and W4.

After the wire holder slide 6 in a head 7 has been indexed into the station P8, which coincides with station S14 of turret T1, the said holder 6 is moved radially outward to project the ends of the wires W1 to W6 into the glass rod 2. This movement of the holder 6 is effected by a vertical finger 193 (FIGS. 1 and 7) which engages roller 128 on holder 6 and which is carried at the end of an arm 194 (FIGS. 1 and 9) which is attached to a vertical shaft 195 to which is attached a follower arm 196 which derives its motion from a cam 197 on shaft 39.

After the ends of the wires W1 to W6 have been embedded in the rod 2 and before the wire holder 6 is retracted, the grip of the leaf spring 19 (FIG. 7) on the wires is released. This releasing action is effected by a rod 198 which has a flat side and which is located in a groove in the side face of holder slide 6 behind the spring 19. The rod 198 has two laterally extending posts 199 and 200 attached to the lower end thereof at right angles to each other. To raise and release the spring 19, the rod 198 is rotated when the post 199 is momentarily engaged and rotated by an arm 201 which is attached to a shaft 202 to which is attached an arm 203 which is actuated through a link 204 and connecting rod 205 by a solenoid (not shown) which is energized by a switch 206 (FIG. 9) under the control of a cam 207 on shaft 40. After the said solenoid has been de-activated and the arm 201 moved back, the pin 193 is swung back and the holder slide 6 is retracted by the spring 124. During the latter part of the retracting motion of slide 6, the other pin 200 on rod 198 strikes an upstanding post 208 on the bracket 123 which causes the rod 198 to be rotated back to bring the flat portion thereof under the spring 19 which allows the finger portions of the spring to again bear against the side of the slide 6 at the slots or grooves 13 to 18.

Preferably, just prior to insertion of the wires W1 to W6 into the plastic rod 2, the ends thereof are heated. For this purpose, there is a burner 209 (FIG. 1) which is supplied with gas through a hose 210 and which is supported at one end of an elongated rod or arm 211 which is pivotally supported on a pin 212 at its other end. The burner is positioned to direct a vertically wide flame onto the wires and is moved along with the wire holder slide 6 during the inserting and retracting movements of said slide 6. For this purpose, the arm 212 is coupled to the slide actuating arm 194 by a link 213 which is pivotally connected at one end to arm 212 and which has, at its other end, a lost motion connection including a slot 214 engaging a pin 215 attached to arm 194, and a spring 216 connected to said pin 215 and to the link 213. In the rest position of arm 194, the post 193 thereon is spaced from the roller 128 on the wire holder 6, the pin 215 is located between the ends of the slot 214 and the burner supporting arm 211 is held against a stop post 217 by the spring 216. As the said arm 194 is pivoted counterclockwise in FIG. 1, the pin 215 slides along the slot 214 until it engages the end thereof at the same time that the post 193 engages the roller 128 so that the burner 209 is moved together with the holder 6 to maintain the heating of the ends of wires W1 to W6 until they are embedded in the glass rod 2.

While we have shown and described a preferred species of our invention, it will be evident to those skilled in the art that various modifications, substitutions and omissions may be made without departing from the spirit and scope of the invention. Thus, it will be evident that the number and the length of wires inserted into the glass rod may be varied, for example by varying the number of wire feeding mechanisms F1, F2 and F3, or modifying any one or more of them to feed a single wire length instead of two lengths as illustrated herein and by substituting a wire holder slide 6 having any desired arrangement of slots for the reception of the wire.

What we claim as new and desire to secure by Letters Patent of the United States is:

1. In a machine for making bridge members of the class described, the combination of a first horizontal turret, a plurality of vertically disposed chuck members equally spaced about the periphery of said turret and each adapted to support a length of glass rod, means for indexing said turret to carry the chucks to a series of stations, means at one of said stations to effect lowering of the rod in a chuck at said station to a predetermined elevation, means at a series of said stations for heating to plasticity portions of said glass rods extending from said chucks, a second horizontal turret mounted adjacent said first turret, a plurality of heads spaced about the periphery of said second turret, means for indexing said second turret in synchronism with said first turret to bring successive heads of said second turret into registry with successive chuck members at an inserting station at the periphery of said first turret, each of said heads comprising a horizontally reciprocable slide member having holding means for supporting a plurality of horizontally disposed wires in vertical alignment and with their forward ends projecting from the front end of said slide member, means arranged at the periphery of said second turret for inserting lengths of wire into the holding means of said slide members, and means for actuating the slide member of a head as it comes into registry with a chuck member at said inserting station to carry the slide member forward and thrust and embed the ends of the wires carried thereby into the plastic glass rod held by the chuck member, and means adjacent said first turret at a location subsequent to said inserting station for severing the lower end portions of successive said rods which have the said wires embedded therein.

2. In a machine as set forth in claim 1, a backing die having a vertically elongated concave face and mounted at the said inserting station to be in apposition to said wire holding slide member, and means for reciprocating said backing die between a retracted position and an advanced position where it is contiguous to the portion of the glass rod extending from the chuck at said station during the insertion of the said wires into the glass rod by said slide member.

3. In a machine for making bridge members of the class described, the combination of a first horizontal turret, a plurality of vertically disposed chuck members equally spaced about the periphery of said turret and each adapted to support a length of glass rod stock, means for indexing said turret to carry the chucks to a series of stations, means at one of said stations for lowering and gauging the rod in a chuck at said station including means for opening and closing the chuck to momentarily release the rod and gauging means arranged to receive and support the lower end of the rod at a desired elevation during the period the chuck is opened, means at a series of said stations for heating to plasticity portions of said glass rods extending from said chucks, a second horizontal turret mounted adjacent said first turret, a plurality of heads spaced about the periphery of said second turret, means for indexing said second turret in synchronism with said first turret to bring successive heads of said second turret into registry with successive chuck members at an inserting station at the periphery of said first turret, each of said heads comprising a horizontally reciprocable slide member having holding means for supporting a plurality of horizontally disposed wires in vertical alignment and with their forward ends projecting from the front end of said slide member, means arranged at the periphery of said second turret for inserting lengths of wire into the holding means of said slide members, and means for actuating the slide member of a head as it comes into register with a chuck member at said inserting station to carry the slide member forward and thrust and embed the ends of the wires carried thereby into the plastic glass rod held by the chuck member, and means adjacent said first turret at a location subsequent to said inserting station for severing the lower end portions of successive said rods which have the said wires embedded therein.

4. In a machine for making bridge members of the class described, the combination with means for holding vertically a length of glass rod and means for heating said rod to a plastic condition, of wire feeding and inserting means comprising a horizontal turret located adjacent said rod holding means, a plurality of heads spaced about the periphery of said turret, means for indexing said turret to carry the heads to a series of stations and to bring successive heads into registry with said rod holding means, each of said heads comprising a wire-holding slide member mounted to reciprocate radially of said turret and having holding means for supporting a plurality of horizontally disposed wires in vertical alignment and with their forward ends projecting from the front end of said slide member, said holding means comprising horizontally extending and vertically aligned grooves in said slide and means to resiliently retain the wires in said grooves, wire feeding means arranged at the periphery of said turrets at certain of said stations for inserting lengths of wire end foremost into the said grooves of said slide members, and means for actuating the slide member of a head as it comes into registery with the rod holding means to carry the slide member radially outward of the turret and thrust the ends of the wires carried thereby into the plastic glass rod held by said rod holding means.

5. In a machine for making bridge members of the class described, the combination with means for holding vertically a length of glass rod and means for heating said rod to a plastic condition, of wire feeding and inserting means comprising a turret located adjacent said rod holding means, a plurality of heads spaced about the periphery of said turret, means for indexing said turret to carry the heads to a series of stations and to bring successive heads into registry with said rod holding means, each of said heads comprising a horizontally reciprocable wire-holding slide member having holding means for supporting a plurality of horizontally disposed wires in vertical alignment and with their forward ends projecting from the front end of said slide member, wire feeding means arranged at the periphery of said turret at certain of said stations for inserting lengths of wire into the holding means of said slide members, means for raising and lowering certain of said wire feeding means during each dwell period of the turret to be at two different elevations, means for actuating said wire feeding means while at each of said elevations to feed two lengths of wire into the slide member associated therewith to occupy vertically spaced positions in said slide member, and means for actuating the slide member of a head as it comes into registry with the rod holding means to carry the slide member forward and thrust the ends of the wires carried thereby into the plastic glass rod held by said rod holding means.

6. In a machine for making bridge members of the class described, the combination with means for holding vertically a length of glass rod and means for heating said rod to a plastic condition, of wire feeding and inserting means comprising a turret located adjacent said rod holding means, a plurality of heads spaced about the periphery of said turret, means for indexing said turret to carry the heads to a series of stations and to bring successive heads into registry with said rod holding means, each of said heads comprising a horizontally reciprocable wire-holding slide member having holding means for supporting a plurality of horizontally disposed wires in vertical alignment and with their forward ends projecting from the front end of said slide member, wire feeding means arranged at the periphery of said turret at certain of said stations for inserting lengths of wire into the holding means of said slide members, at least certain of said wire feeding means comprising a spool for wire stock, feeding mechanism comprising means for feeding the wire stock to insert an end portion thereof into an associated one of said wire-holding slide members and means for severing said end portion of the wire, means for raising and lowering said feeding mechanism during each dwell period of the turret to be at two different elevations, means for actuating said feeding mechanism while at each of said elevations to feed and sever two lengths of wire and insert them into the said associated slide member at vertically spaced positions therein, and means for actuating the slide member of a head as it comes into registry with the rod holding means to carry the slide member forward and thrust the ends of the wires carried thereby into the plastic glass rod held by said rod holding means.

7. In combination; a turret having a wire-receiving means at the periphery thereof, means for indexing said turret to carry the wire-receiving means to a plurality of stations with a dwell period at each station; a wire feeding mechanism at one of said stations comprising means to support a spool of wire stock, a slide member, means mounting said slide member for vertical reciprocation, feeder means on said slide member for grasping said wire stock and feeding an end portion thereof to the wire-receiving means on said turret, and cutter means also mounted on said slide member for severing the said end portion of the wire stock, means for raising and lowering said slide member during each dwell period of the turret to be at two different elevations, and means for actuating said feeder means and said cutter means while at each of said elevations to feed and sever two lengths of wire and deliver them to said wire-receiving means at vertically spaced positions thereon during a single dwell period of the turret.

References Cited in the file of this patent
UNITED STATES PATENTS

| | | |
|---|---|---|
| 1,591,716 | Madden et al. | July 6, 1926 |
| 1,801,108 | Renfel et al. | Apr. 14, 1931 |